Jan. 5, 1965 N. NIKOLAYUK 3,164,834
WAVEGUIDE TOWER WITH STACKED SLOT RADIATORS
Filed Nov. 25, 1960 4 Sheets-Sheet 1

INVENTOR.
NICHOLAS NIKOLAYUK
BY
George T. Craig
ATTORNEY

INVENTOR.
NICHOLAS NIKOLAYUK
BY
George J. Craig
ATTORNEY

Jan. 5, 1965 N. NIKOLAYUK 3,164,834
WAVEGUIDE TOWER WITH STACKED SLOT RADIATORS
Filed Nov. 25, 1960 4 Sheets-Sheet 3
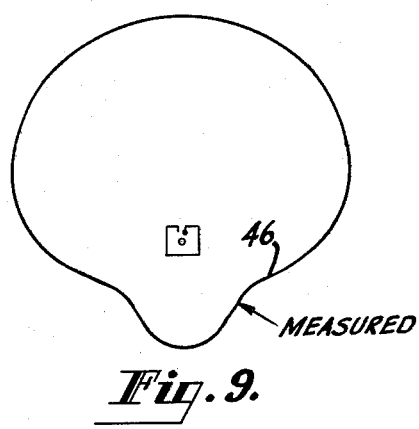
*Fig. 9.* MEASURED
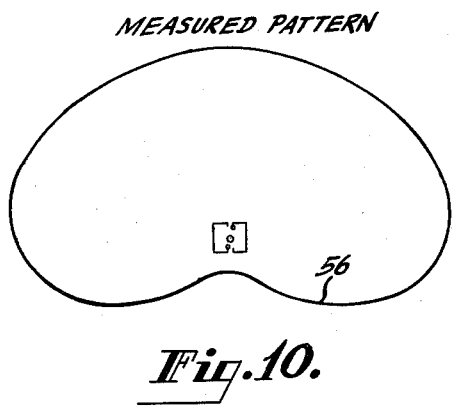
MEASURED PATTERN
*Fig. 10.*
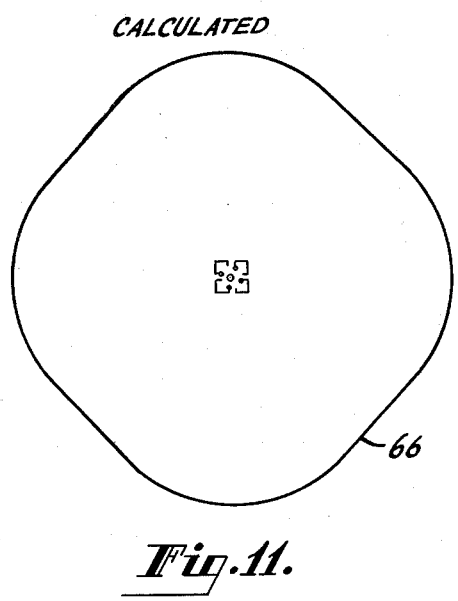
CALCULATED
*Fig. 11.*
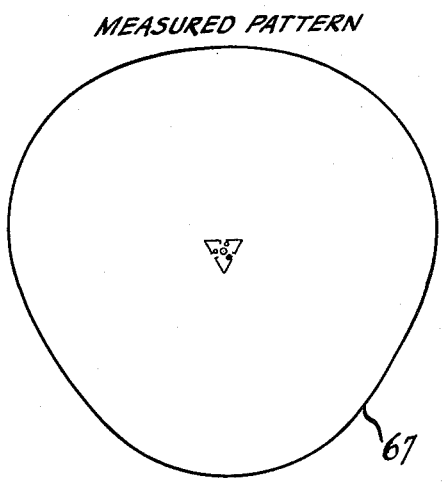
MEASURED PATTERN
*Fig. 12.*
INVENTOR.
NICHOLAS NIKOLAYUK
BY
George J. Craig
ATTORNEY Jan. 5, 1965  N. NIKOLAYUK  3,164,834
WAVEGUIDE TOWER WITH STACKED SLOT RADIATORS
Filed Nov. 25, 1960  4 Sheets-Sheet 4

MEASURED PATTERN

MEASURED PATTERN

INVENTOR.
NICHOLAS NIKOLAYUK
BY
George J. Craig
ATTORNEY

United States Patent Office 3,164,834
Patented Jan. 5, 1965

3,164,834
WAVEGUIDE TOWER WITH STACKED
SLOT RADIATORS
Nicholas Nikolayuk, Gibbsboro, N.J., assignor to Radio
Corporation of America, a corporation of Delaware
Filed Nov. 25, 1960, Ser. No. 71,647
6 Claims. (Cl. 343—771)

The present invention relates to high frequency, high gain antennas, and more particularly to novel antennas which are of tower-like construction, and which are capable of providing a wide variety of horizontal directional patterns by simple changes in structure.

Previously known antennas operating in the very high frequency range (VHF) involved a separate mechanical as well as an electrical design problem for each horizontal radiation pattern from an omni-directional pattern to a pattern which is sharply restricted with respect to direction and strength of the radiated field.

In accordance with the present invention, a novel tower-like structure, which may be conveniently fabricated from readily obtainable structural members, presents radiating slots and coupling means to provide a radiating pattern which is readily predeterminable.

The principal object of the present invention is to provide a novel directional antenna capable of being constructed to operate at any desired frequency in the upper frequency ranges with high power radiation capabilities.

Another object of the present invention is to provide a directional antenna of novel construction which is capable of fabrication from readily obtainable structural members.

A further object of the present invention is to provide an antenna having a novel arrangement of a device for coupling radio frequency energy from a transmission line to a radio frequency radiating element.

Still another object of the present invention is to provide a novel directional antenna in the form of a tower and in which the structural elements of the tower are arranged to provide radio frequency radiation means in a predetermined arrangement whereby to provide a predetermined radiation pattern.

Other objects and advantages of the present invention will, of course, become apparent and immediately suggest themselves to those skilled in the art to which the invention is directed from a reading of the following specification in connection with the accompanying drawing in which:

FIGS. 9, 10, 11, 12, 13 and 14 are curves illustrating the radiational field patterns around the antennas having the parts arranged as shown by FIGS. 3, 4, 5, 6, 7 and 8, respectively;

Figure 1:
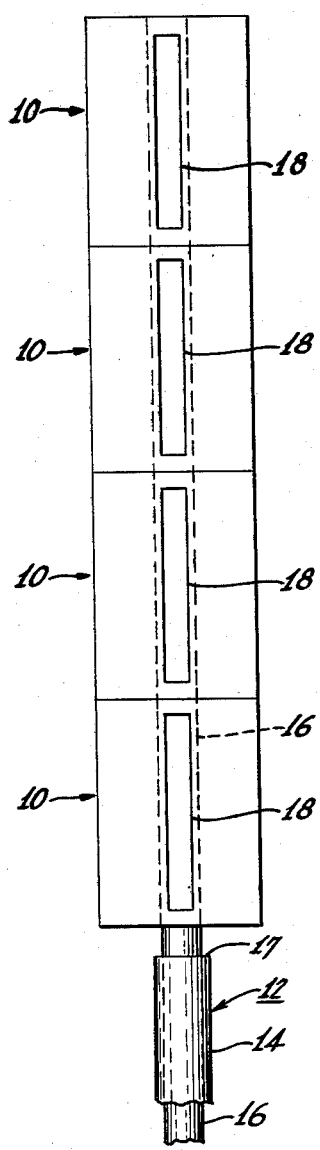
FIG. 1 is a view, more or less diagrammatic, of an antenna system embodying the present invention.

FIG. 1 of the drawing shows an antenna constructed to include a plurality of vertical elements 10 of the present invention arranged in a vertical array. In the illustrative showing of FIG. 1, four vertical elements are shown, but it will be understood that the number may be greater or less depending upon the desired service coverage and the field strength requirements at various predetermined locations in the service area. Any radiation pattern can be predetermined in accordance with the scope of this invention to prevent co-channel interference, or other kinds of interference, with existing television transmitters operating in nearby areas. The antenna of FIG. 1 is or may be fed in the usual manner by a coaxial transmission line 12 including an outer conductor 14 and an inner conductor 16. A gas seal and any known or desired impedance matching device is indicated by reference character 17. It will be understood that the inner conductor 16 proceeds upwardly through the antenna of FIG. 1 and that the outer conductor 14 is electrically in communication with the exterior portions of the vertical elements 10 of the element. The inner conductor 16 is, for example, connected to the exterior portions of the vertical elements 10 of the antenna at the end of the antenna to provide an antenna shorted at its end opposite the feed end. Slots 18 are provided in each vertical element to provide radiation of high frequency energy. The manner of constructing these slots and provisions for feeding energy thereto will be described more in detail hereinafter.

Figure 2:
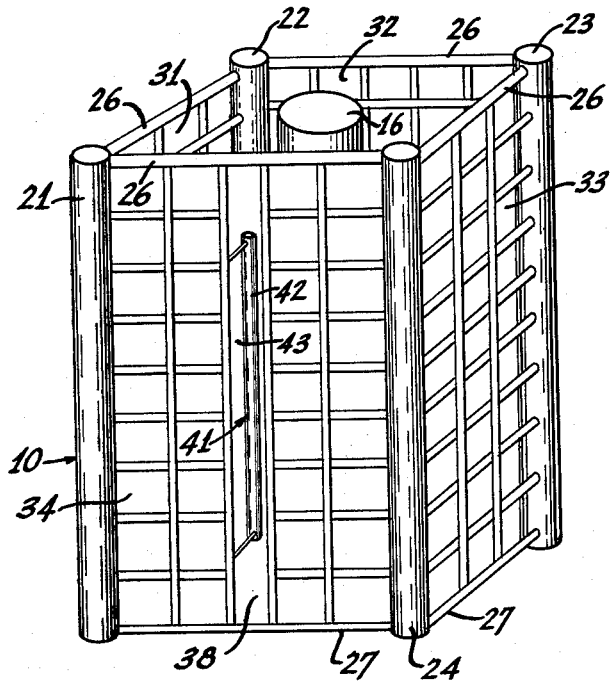
FIG. 2 is a view in perspective of one vertical element of the plurality of vertical elements indicated by FIG. 1 as being stacked vertically.
Figure 3:
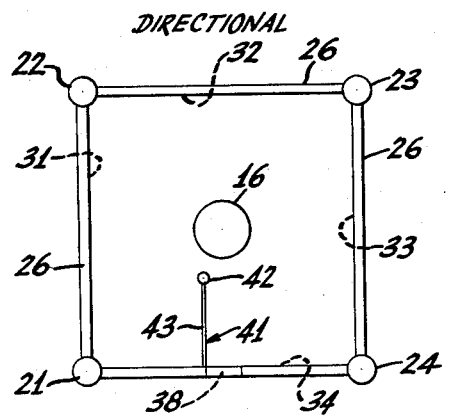
FIG. 3 is a view in plan of the vertical element of FIG. 2.

FIG. 2 of the drawing shows one of the vertical elements 10 in greater detail. FIG. 3 shows, diagrammatically, the arrangement in plan. The vertical element 10 is composed of four corner posts 21, 22, 23 and 24 which may be continuous throughout the length of an antenna of the type shown in FIG. 1 thereby to provide a tower-like structure. The vertical height of the vertical antenna element 10 is substantially one wave length (λ) of the frequency for which the antenna is designed. Top structural members 26 are connected to the corner posts 21 to 24 as shown. In a similar manner, bottom structural members 27 are connected to the corner posts. These top and bottom members may be any of the readily available structural shapes such, for example, as metal angles or channels. Selection of the material will depend on weight and corrosion resisting considerations.

Side panels (four in number in the illustrative example of FIG. 2) 31, 32, 33 and 34 are suitably positioned and connected to the four corner posts and the top and bottom members. As shown by way of example these side panels are made of wire or rod mesh for the purpose of reducing weight and wind pressure. However, it is to be understood that these panels may be constructed of any suitable electrically conductive material. The illustrative example of FIG. 2 is provided with a radiating slot 38 similar in function to the slots 18 described in connection with FIG. 1 of the drawing. A convenient structural arrangement for providing the slot 38 will be fully described in connection with FIGS. 15 and 16 of the drawing. The length of the slot 38 is less than or equal to one wave length of the frequency for which the vertical element 10 is designed.

Figure 16:
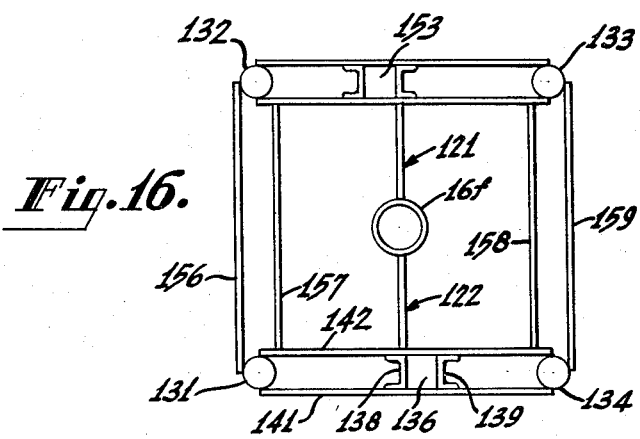
FIG. 16 is a view in plan of the antenna of FIG. 14.
Figure 15:
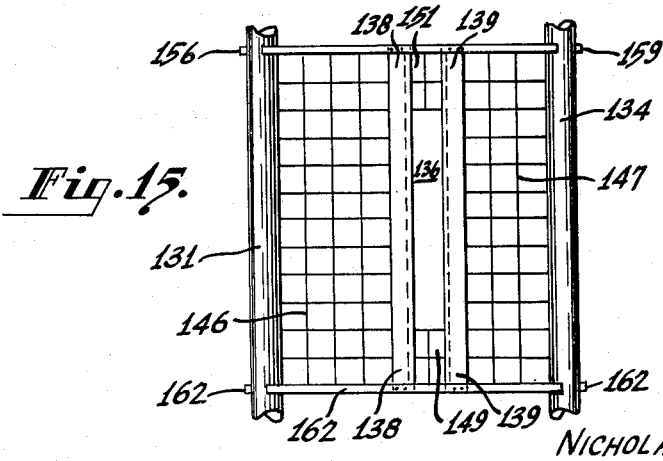
FIG. 15 is a view in side elevation of a vertical antenna of this invention showing, illustratively, the use of structural members for fabrication of the antenna.

A coupler member 41 is secured to one edge of the slot 38. This coupler member is similar to that shown in the co-pending application of Steven J. Bazan, Serial No. 685,920, filed September 24, 1957, now Patent No. 2,981,947. The coupling system provided by the present invention includes structural arrangements for obtaining substantially any desired horizontal radiation pattern. This coupler member 41 may comprise a rod-like member 42 supported by a sheet of conductive material, or the like, 43 secured to one edge of the slot 38. This member 43 may be mesh-like or be composed of parallel horizontal rods or parallel vertical rods, or a combination of the two. As shown, it presents a bidimensional outline. The coupler 42 can also be used to support the inner conductor. FIGS. 15 and 16 of the drawing, to be described hereinafter, indicate a structural arrangement in more detail.

Both the amplitude and phase of the energy radiated from each slot is controlled by the slot length and coupler penetration into the field inside the antenna. As shown by the several figures of the drawing, the number of slots in each vertical element or layer of the antenna can be varied, as well as their location around the antenna structure. A large variety of patterns can be produced as shown by other figures of the drawing which are given by way of example. With the parameters available in accordance with the invention; such, for example, as: the amplitude and phase of the radiated energy; the number of slots; their configuration with respect to each other; and their arrangement; the diameter over wave length ratio; and the shape of the cross section, almost any reasonable pattern shape can be produced and the general pattern shape can be predicted by calculation.

FIG. 9 of the drawing shows the horizontal distribution pattern 46 of an antenna employing one or more of the vertical elements shown in FIGS. 2 and 3 of the drawing. This type of pattern may be referred to as a "skull." In FIG. 3 of the drawing the total perimeter of the element is one and one-half wavelength or less for the particular frequency for which the particular example is designed. It will be understood from the foregoing that the lobes of the pattern 46 may be shaped as desired and that the coverage or service area will depend somewhat upon the diameter over wavelength ratio.

Figure 4:
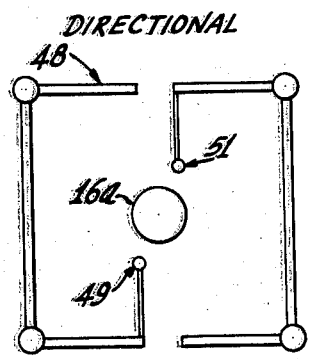
FIGS. 4, 5, 6, 7 and 8 are views similar to FIG. 3 of the drawing but showing various arrangements of the illustrated structural members for obtaining predetermined radiation patterns.

FIG. 4 of the drawing shows a vertical element 48 which is similar to the vertical element 10 of FIG. 2 of the drawing. In the arrangement of FIG. 4 two couplers 49 and 51 are employed. These couplers are shown as being positioned with respect to the inner conductor 16a in a manner similar to the location of the coupler 41 of FIG. 3 with respect to the inner conductor 16. The side of the slot on which each coupler is disposed determines variations in the pattern. The configuration and placement of one slot with respect to the other also determines variations in the pattern. As shown in FIG. 4, the produced pattern is a peanut-type. Also a cardioid-type pattern can be obtained by using this configuration by varying one coupler and its slot. This is illustrated by the pattern 56 in FIG. 10 of the drawing. Here again, it will be understood that the lobes of the horizontal distribution pattern 56 may be varied in accordance with the invention by changing certain of the parameters referred to in the foregoing.

Figure 5:
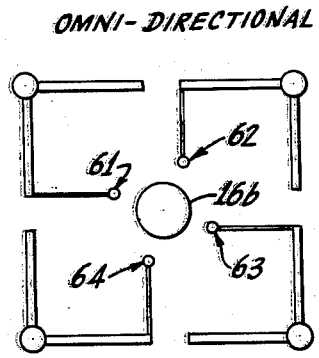

FIG. 5 of the drawing is a view similar to FIG. 3 and indicates use of four coupler members 61, 62, 63 and 64 which are, or may be, symmetrically arranged with respect to the inner conductor 16b. FIG. 11 of the drawing shows the horizontal distribution pattern 66 of an antenna employing the coupler member arrangement of FIG. 5 of the drawing. From the shape of the horizontal pattern 66 it will be seen that an antenna constructed of a plurality of the vertical elements shown in FIG. 5 will give an omni-directional pattern.

Figure 6:
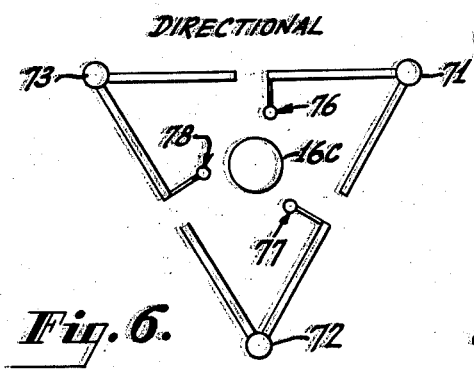

FIG. 6 of the drawing shows a view in plan of a modified vertical antenna element similar to the vertical antenna element 10 except that it is triangular in shape and, therefore, would provide a triangular tower-like antenna. The vertical antenna of FIG. 6 comprises three corner posts 71, 72 and 73 and an inner conductor 16c. Three coupler members 76, 77 and 78 are positioned with respect to the inner conductor 16c in a manner similar to the location of the coupler member 41 with respect to the inner conductor 16 of FIG. 3. The horizontal distribution pattern 67 of an antenna constructed as shown in FIG. 6 would be omni-directional pattern as shown in FIG. 12.

Figure 7:
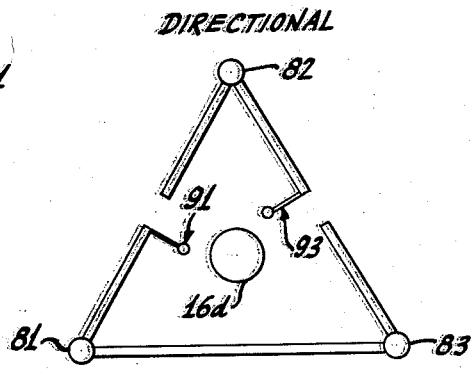
Figure 13:
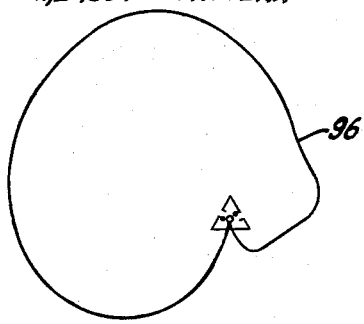

FIG. 7 of the drawing shows a view in plan of another modified vertical antenna element similar to the vertical antenna element of FIG. 6 which is triangular in shape and, therefore, also, would provide a triangular tower-like antenna. The vertical antenna element of FIG. 7 comprises three corner posts 81, 82 and 83 and an inner conductor 16d. Two coupler members 91 and 93 are positioned with respect to the inner conductor 16d in a manner similar to the location of the coupler member 41 with respect to the inner conductor 16 of FIG. 3. The horizontal distribution pattern 96 of an antenna constructed as shown in FIG. 7 is shown in FIG. 13 of the drawing. This pattern has two lobes one of which extends over a greater area than the other. This type of pattern is asymmetrical.

Figure 8:
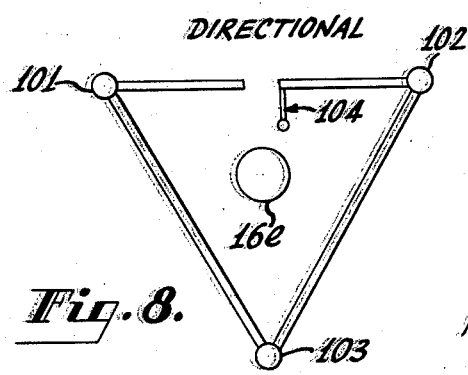
Figure 14:
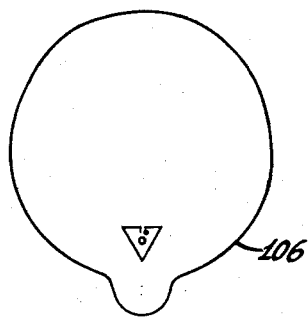

FIG. 8 of the drawing shows a view in plan of still another modified vertical antenna element similar to the vertical antenna element of FIG. 6 which is also of a character to provide a triangular tower-like antenna. The vertical antenna element of FIG. 8 comprises three corner posts 101, 102 and 103 and an inner conductor 16e. A single coupler member 104 is positioned with respect to the inner conductor 16e in a manner similar to the location of the coupler member 91 with respect to the inner conductor 16d of FIG. 7. The horizontal distribution pattern 106 of an antenna constructed as shown in FIG. 8 is shown in FIG. 14 of the drawing. The distribution pattern 106 resembles somewhat the type of distribution pattern obtained with the structure illustrated in FIG. 3 of the drawing.

FIGS. 15 and 16 of the drawing show a modification in which the coupler members 121 and 122 are connected to and serve as supports for the inner conductor 16f. It will be understood that the number of couplers may be varied in FIG. 16 as shown in FIGS. 3 to 8 of the drawing, depending upon the nature of the distribution pattern which is to be provided with respect to the desired lobes and nulls.

The tower-like structure of FIGS. 15 and 16 is supported principally by corner posts 131, 132, 133 and 134. It will be understood that these corner posts may be continuous for the height of the tower and that the structure, best shown by FIG. 15, which provides the slots may be varied in any desired manner depending upon mechanical factors such as stresses set up due to wind load or icing conditions. A slot 136 is provided and outlined by vertically positioned channel members 138 and 139. Horizontal members 141 and 142 are joined in any desired fashion to the corner posts 131 and 134 to serve as structural braces and also to support the mesh panels 146 and 147. These panels 146 and 147 may, in accordance with the invention, be in the nature of sheets of conductive material rather than being in the form of a mesh. The vertical length of the slot 136 is determined by narrower mesh panels 149 and 151.

A second slot 153 is provided and its structure is or may be similar to that already explained for the slot 136. It will be understood that in accordance with a feature of the invention a number of slots may be provided for each panel in all of the illustrative examples shown by FIGS. 3 to 8 as well as the illustrative example of FIGS. 15 and 16.

Structural bracing members 156, 157, 158 and 159 are shown as being connected to the corner posts. It will be understood that these bracing members 156 to 159 may support any desired arrangement of channel members so as to provide any desired slot configuration. Also, their vertical location on the tower will depend somewhat on conditions of mechanical stress which may be encountered at a selected tower location. Another set of horizontal bracing members 162 is shown and it will be understood that their location may also depend upon mechanical considerations. For example, the panel members 146 may extend continuously from the top to the bottom of the tower and the same is also true of the channel members 138 and 139. The slots can then be provided by insertions at selected points of the smaller panels 148 and 151.

What is claimed is:

1. A tower-like antenna for providing a predetermined radiation pattern, comprising a hollow conductor and an inner conductor, said hollow conductor being of fabricated construction and having a plurality of substantially plane conductive members extending longitudinally from end to end of said antenna, each of said plane conductive members haing a longitudinal axis lengthwise thereof, a plurality of corner supports, one of said supports being located at and secured to each line of intersection of said substantially plane conductive members, each of said substantially plane conductive members having a plurality of elongated slots spaced along said hollow conductor and extending substantially longitudinally along said conductor, a conductive coupler member positioned within said hollow conductor adjacent one of the longer edges of each of said slots, each of said coupler members being fastened to said hollow conductor of fabricated construction with its longitudinal axis substantially parallel to said one edge of its respective slot, and each of said coupler members extending toward said inner conductor.

2. A tower-like antenna for providing a predetermined radiation pattern, comprising a hollow conductor and an inner conductor, said hollow conductor being of fabricated constructon and having a plurality of substantially plane conductive members extending longitudinally from end to end of said antenna, a plurality of corner supports, one of said supports being located at and secured to each line of intersection of said substantially plane conductive members, each of said substantially plane conductive members having a plurality of elongated slots spaced along said hollow conductor and extending substantially longitudinally along said conductor, a conductive coupler member positioned within said hollow conductor adjacent one of the longer edges of each of said slots, each of said coupler members being fastened to said hollow conductor of fabricated construction with its longitudinal axis substantially parallel to said one edge of its respective slot, and each of said coupler members being secured to said inner conductor whereby to provide mechanical support for said inner conductor.

3. In a tower-like antenna structure, an element to be employed with similar elements in a vertical arrangement to provide said antenna structure, said element comprising a plurality of corner posts, a plurality of substantially plane members, each of said members extending between an adjacent pair of said corner posts whereby to provide a continuous enclosure, a separately supported electrically conducting member substantially centered with respect to said enclosure, each of said plane members being composed of intersecting metallic strands arranged to provide a mesh-like structure, certain of said strands being interrupted to provide at least one slot vertically arranged with respect to said element, and an elongated conductive member positioned to cooperate with one vertical side of said slot, said elongated member extending inwardly toward said electrically conducting member whereby to cause a radiating field to appear across said slot when a transverse electric field is produced in all directions radially of said centered electrically conducting member upon excitation of said element by radio frequency energy.

4. In a tower-like antenna structure, an element to be employed with similar elements in a vertical arrangement to provide said antenna structure, said element comprising a plurality of corner posts, a plurality of substantially plane members, each of said members extending between an adjacent pair of said corner posts whereby to provide a continuous enclosure, an electrically conducting member substantially centered with respect to said enclosure, each of said plane members being composed of intersecting metallic strands arranged to provide a mesh-like structure, certain of said strands being interrupted to provide at least one slot vertically arranged with respect to said element, an elongated conductive member having one edge thereof secured to one vertical side of said slot, said elongated member extending inwardly toward said electrically conducting member whereby to cause a radiating field to appear across said slot when a transverse electric field is produced in all directions radially of said electrically conducting member upon excitation of said element by radio frequency energy, and the remaining edge of each of said elongated conductive members being secured to said centered electrically conducting member whereby to provide mechanical support therefor.

5. A tower-like antenna for providing a predetermined radiation pattern, comprising a hollow conductor and an inner conductor, said hollow conductor being of fabricated construction and having a plurality of substantially plane conductive members extending longitudinally from end to end of said antenna, a plurality of corner supports, each of said supports being continuous for the height of the antenna, one of said supports being located at and secured to each line of intersection of said substantially plane conductive members, each of said substantially plane conductive members having a plurality of elongated slots spaced along said hollow conductor and extending substantially longitudinally along said conductor, a conductive coupler member positioned within said hollow conductor adjacent one of the longer edges of each of said slots and extending inwardly toward said inner conductor and each of said coupler members being fastened to said hollow conductor of fabricated construction with its longitudinal axis substantially parallel to said one edge of its respective slot.

6. In a tower-like antenna structure, an element to be employed with similar elements in a vertical arrangement to provide said antenna structure, said element comprising a plurality of corner posts, each of said supports being continuous for the height of the antenna, a plurality of bi-dimensional substantially plane members, each of said members extending between an adjacent pair of said corner posts whereby to provide a continuous enclosure, an electrically conducting member substantially centered with respect to said enclosure, each of said plane members being composed of intersecting metallic strands arranged to provide a mesh-like structure, certain of said strands being interrupted to provide at least one slot vertically arranged with respect to said element, an elongated conductive member having one edge thereof secured to one vertical side of said slot, and said elongated member extending inwardly toward said electrically conducting member whereby to cause a radiating field to appear across said slot when a transverse electric field is produced in all directions radially of said electrically conducting member upon excitation of said element by radio frequency energy.

References Cited in the file of this patent

UNITED STATES PATENTS

| | | |
|---|---|---|
| 2,477,510 | Chu | July 26, 1949 |
| 2,480,153 | Masters | Aug. 30, 1949 |
| 2,611,867 | Alford | Sept. 23, 1952 |
| 2,771,606 | Kandoian | Nov. 20, 1956 |
| 2,810,907 | Woodward | Oct. 22, 1957 |
| 2,818,565 | Ajioka et al. | Dec. 31, 1957 |
| 2,935,747 | Ghose | May 3, 1960 |
| 2,981,947 | Bazan | Apr. 25, 1961 |

FOREIGN PATENTS

| | | |
|---|---|---|
| 725,386 | Great Britain | Mar. 2, 1955 |